(12) United States Patent
Edwards et al.

(10) Patent No.: US 11,448,799 B2
(45) Date of Patent: Sep. 20, 2022

(54) DEVICE AND METHOD FOR ALTERING THE VERGENCE OF LIGHT TO IMPROVE HUMAN VISION OF AN ELECTRONIC DISPLAY

(71) Applicants: Forgetspecs.com Pty Ltd, Brisbane (AU); Queensland University of Technology, Brisbane (AU)

(72) Inventors: Darrell Bruce Edwards, Brisbane (AU); Marwan Suheimat, Brisbane (AU); David A. Atchison, Brisbane (AU)

(73) Assignees: FORGETSPECS.COM PTY LTD, Brisbane (AU); QUEENSLAND UNIVERSITY OF TECHNOLOGY, Brisbane (AU)

( * ) Notice: Subject to any disclaimer, the term of this patent is extended or adjusted under 35 U.S.C. 154(b) by 202 days.

(21) Appl. No.: 16/763,658

(22) PCT Filed: Nov. 13, 2018

(86) PCT No.: PCT/AU2018/000220
§ 371 (c)(1),
(2) Date: May 13, 2020

(87) PCT Pub. No.: WO2019/095000
PCT Pub. Date: May 23, 2019

(65) Prior Publication Data
US 2020/0363563 A1      Nov. 19, 2020

(30) Foreign Application Priority Data

Nov. 14, 2017 (AU) .............................. 2017904604
May 18, 2018 (AU) .............................. 2018901741

(51) Int. Cl.
| G02B 3/00 | (2006.01) |
| G02B 1/04 | (2006.01) |
| G02B 17/06 | (2006.01) |

(52) U.S. Cl.
CPC .......... *G02B 3/0056* (2013.01); *G02B 1/041* (2013.01); *G02B 17/061* (2013.01); *G02B 2003/0093* (2013.01)

(58) Field of Classification Search
CPC .... G02B 3/0056; G02B 1/041; G02B 17/061; G02B 2003/0093; G02B 27/16;
(Continued)

(56) References Cited

U.S. PATENT DOCUMENTS

| 2009/0180180 A1 | 7/2009 | Shimshi et al. |
| 2012/0154920 A1* | 6/2012 | Harrison .............. G02B 27/017 359/619 |
| 2017/0242161 A1 | 8/2017 | Zhang et al. |

* cited by examiner

Primary Examiner — James C. Jones
(74) Attorney, Agent, or Firm — Hodgson Russ LLP (57) ABSTRACT

A device for altering vergence of light to improve human vision of an electronic display. The change in vergence is received at the pupil of the wearer. The altered light effectively recreates the rays emitted by a pixel such that they reach a presbyopic eye as though they were being viewed at a distance (i.e., the rays are substantially parallel). As such, the emmetropic presbyopic eye produces a sharp image of the electronic display. The device comprises: a refractive element that refracts rays, emitted from a pixel of an electronic display, at a predetermined vergence, wherein the refractive element is located directly adjacent or on the electronic display.

18 Claims, 5 Drawing Sheets

(58) Field of Classification Search
CPC ...... G02B 5/10; G02B 19/0023; G02B 30/27; G02B 3/0037; G02B 3/04; G02B 19/0014; G02B 19/0047; G02B 27/12; G02B 27/30; G02B 5/0816; G02C 7/086; G06F 1/1609

See application file for complete search history.

DEVICE AND METHOD FOR ALTERING THE VERGENCE OF LIGHT TO IMPROVE HUMAN VISION OF AN ELECTRONIC DISPLAY

FIELD OF THE INVENTION

The present invention relates to the field of vision correction. More particularly, the invention relates to a device and method for altering the vergence of light. Most particularly, the invention relates to a device and method for improving and/or correcting human vision of an electronic display.

BACKGROUND TO THE INVENTION

Any reference to background art herein is not to be construed as an admission that such art constitutes common general knowledge in Australia or elsewhere.

For an emmetropic presbyopic human eye, rays arriving from a distant object are substantially parallel rays which are focused at the retina and therefore produce a sharp image.

For objects that are closer, such as a computer screen or mobile phone about 35 cm away from the eye, the rays arriving at the presbyopic eye are diverging and, due to the inflexibility of the lens of the eye, are focused behind the retina, and therefore produce a blurred image.

Some existing solutions to this problem involve optics introduced in the spectacle plane (e.g. the plane of the lenses of reading glasses positioned at approximately 1.5 cm from an eye). These optics manipulate the rays so that they reach the eye parallel to each other and can then be focused accurately by the lens of the eye onto the retina and produce a clear image.

As is well known, many users would prefer not to have to constantly carry reading glasses with them, and would prefer to see their digital devices clearly without wearing reading glasses.

There is therefore a need for an improved device and method for improving and/or correcting human vision of an electronic display.

OBJECTS OF THE INVENTION

It is an object of the present invention to provide a device and method for altering the vergence of light to improve and/or correct human vision of an electronic display that addresses, or at least ameliorates, one or more of the aforementioned problems of the prior art and/or provides a useful commercial alternative.

SUMMARY OF THE INVENTION

In one form, although it need not be the only or indeed the broadest form, the invention resides in a device for altering vergence of light to improve and/or correct human vision of an electronic display, the device comprising:
  a refractive element that refracts rays, emitted from a pixel of an electronic display, at a predetermined vergence,
  wherein the refractive element is located directly adjacent or on the electronic display.

Suitably, the refractive element comprises a convex structure. Preferably, the refractive element comprises a plano-convex structure. Preferably, the plano-convex structure has a radius that collimates the rays emitted from the pixel.

In an embodiment, the thickness of the plano-convex structure is suitably between about 100 μm and about 250 μm, more suitably between about 150 μm and about 200 μm, preferably between about 170 μm and about 190 μm, more preferably between about 180 μm and about 190 μm, and most preferably about 187 μm.

In one embodiment, the radius of curvature of the plano-convex structure is suitably between about 50 μm and about 200 μm, more suitably between about 70 μm and about 170 μm, preferably between about 100 μm and about 150 μm, more preferably between about 130 μm and about 140 μm, and most preferably about 137 μm.

Suitably, the refractive element collimates rays emitted from the pixel at a predetermined angle. Preferably, refracted rays are substantially parallel.

In some embodiments, the refractive element is formed of a clear polymer. Suitably, the clear polymer has glass-like properties. More suitably, the clear polymer has a refractive index of between about 1.5 and about 1.8. Preferably, the refractive index is 1.555. In one embodiment, the clear polymer is OrmoClear® FX.

Preferably, the device is housed or located in a film, housing or casing.

In some embodiments, there is a plurality of devices for collimating light housed within the film, housing or casing. It is preferable that the plurality of devices are arranged in the film, housing or casing in an array. In a particularly preferred embodiment, the array is an m by n array, where m is the number of horizontal pixels of the electronic display and n is the number of vertical pixels of the electronic display.

Preferably, a device or plurality of devices housed in the film, housing or casing are applied to the display of an electronic device. Alternatively, the device may be manufactured into the display of an electronic device.

In another form, the invention resides in a method of improving and/or correcting human vision of an electronic display, the method including the steps of:
  refracting rays, emitted from a pixel of the electronic display, through a refractive element at a predetermined vergence;
  wherein the refractive element is located directly adjacent or on the electronic display,
  to improve and/or correct human vision of an electronic display.

The refractive element is as substantially described hereinabove.

In yet another form, the invention resides in a method of forming a device for altering vergence of light to improve and/or correct human vision of an electronic display, the method including the steps of:
  forming at least one refractive element that refracts rays, emitted from a pixel of an electronic display, at a predetermined vergence,
  wherein the refractive element is located directly adjacent or on the electronic display.

The refractive element is as substantially described hereinabove.

In another form, although not necessarily the only or the broadest form, the invention resides in a device for altering the vergence of light to improve and correct human vision of electronic displays, the device comprising:
  a first mirror reflecting rays emitted from a pixel of an electronic display; and
  a second mirror, wherein the first mirror reflects the rays at an angle onto the second mirror and the second mirror reflects the reflected rays at a predetermined vergence.

Preferably, the first mirror comprises an annulus.

Suitably, the first and second mirrors are spherical mirrors. However, the first and second mirrors can also be flat or plane mirrors.

Preferably, the first spherical mirror is a concave mirror and the second spherical mirror is a convex mirror.

Alternatively, the first flat mirror has a hollow, substantially frustoconical shape having openings at the diametrically opposing faces of the shape for receiving and communicating light, and the second flat mirror has a substantially conical shape.

In some embodiments, the first mirror is preferably positioned between the second mirror and a screen of the electronic device. Alternatively, the second mirror is preferably positioned between the first mirror and a screen of the electronic device.

Preferably, a diameter of the second mirror is approximately equal to or less than a diameter of an aperture of the annulus of the first mirror.

Preferably, the device further comprises one or more obstructions for blocking at least some light emitted from a pixel of a display screen.

Preferably, the obstructions block rays of light pointing directly at an eye of a human observer of the display screen.

Preferably, the device is housed or located in a film, housing or casing.

In some embodiments, there is a plurality of devices for collimating light housed within the film, housing or casing. It is preferable that the plurality of devices is arranged in the film, housing or casing in an array. In some particularly preferred embodiments, the array is an m by n array, where m is the number of horizontal pixels of an electronic display and n is the number of vertical pixels of the electronic display.

Preferably, a device or plurality of devices housed in the film, housing or casing are applied to the display of an electronic device.

In another form, the invention resides in a method of correcting human vision of electronic displays, the method comprising the steps of:

reflecting light emitted from a pixel off a first mirror at an angle toward a second mirror; and reflecting the reflected light off the second mirror at a predetermined vergence.

The various features and embodiments of the present invention referred to in the individual sections above and in the description which follows apply, as appropriate, to other sections, mutatis mutandis. Consequently features specified in one section may be combined with features specified in other sections as appropriate.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in a device and method for improving and/or correcting human vision of an electronic display. Accordingly, the method and device have been illustrated in concise schematic form in the drawings, showing only those specific details that are necessary for understanding the embodiments of the present invention, so as to not obscure the disclosure with excessive detail that will be readily apparent to those of ordinary skill in the art having the benefit of the present description.

In this specification, adjectives such as first and second, horizontal and vertical, and the like may be used solely to distinguish one element or action from another element or action without necessarily requiring or implying any actual such relationship or order.

In the specification, words such as "comprises" or "includes" are intended to define a non-exclusive inclusion, such that a method or device that comprises a list of elements does not include only those elements but may include other elements not expressly listed, including elements that are inherent to such a method or device.

As used herein, the term 'about' means the amount is nominally the number following the term 'about' but the actual amount may vary from this precise number to an unimportant degree.

Presbyopia occurs during the aging process, and is caused by a hardening of the lens of the eye. Hardening of the lens causes the eye to focus the rays behind, rather than on, the retina when viewing near objects and results in a blurry image.

Embodiments Using a Refractive Element at a Predetermined Vergence

Some embodiments of the present invention provide a device and method for altering the vergence of light to improve and/or correct human vision of an electronic display. Broadly, the device comprises at least one refractive element that alters the vergence of light emitted from a pixel of an electronic display. The refractive element being located directly adjacent or on the electronic display. This change in vergence is received at the pupil of the wearer. The altered light effectively recreates the rays emitted by a pixel such that they reach a presbyopic eye as though they were being viewed at a distance (i.e., the rays are substantially parallel). As such, the emmetropic presbyopic eye produces a sharp image of the electronic display.

Embodiments of the present invention provide a simpler solution than prior art systems through the use of a refractive element corresponding to each pixel of an electronic display.

Figure 1:
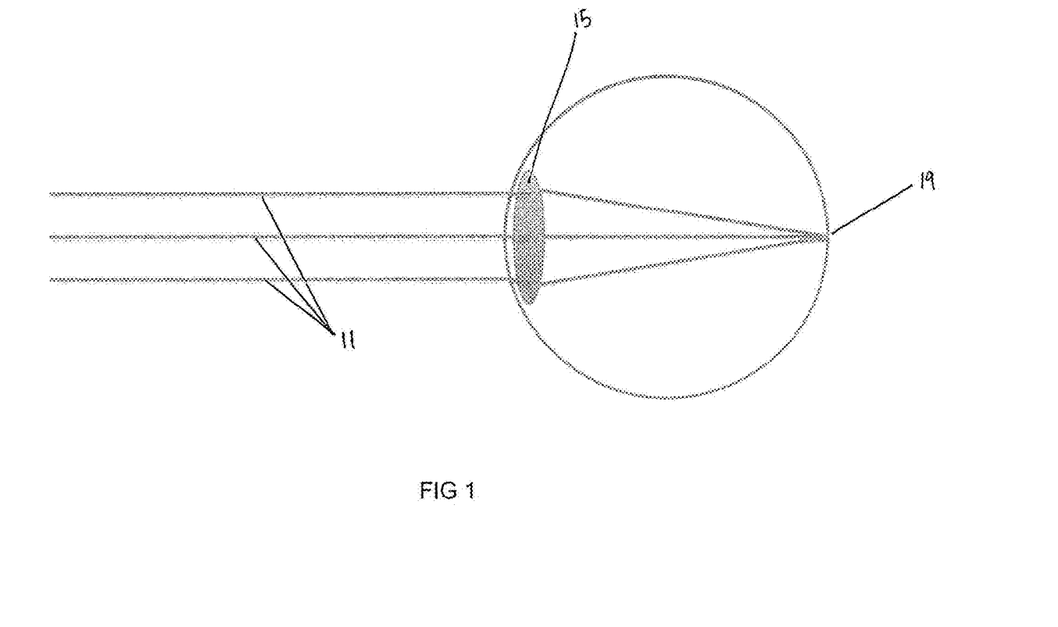
FIG. 1 illustrates parallel rays from a distant object focusing on the retina of an emmetropic presbyopic eye.

Turning to FIG. 1, there is illustrated parallel rays 11 from a distant object (not shown) focused on the retina 19 of an emmetropic presbyopic eye. It will be appreciated that for an emmetropic presbyopic eye, the rays arriving from a distant object (parallel rays) are focused/converged by lens 15 of the eye onto the retina 19 and produces a sharp image.

Figure 2:
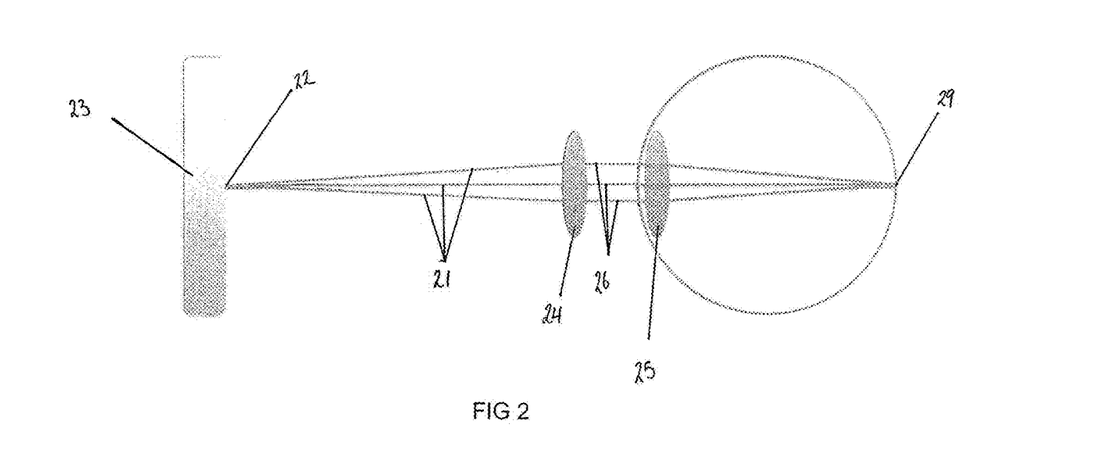
FIG. 2 illustrates a lens used in the spectacle plane to achieve a clear image of an electronic display with an emmetropic presbyopic eye.

Referring to FIG. 2, there is illustrated lens 24 of a spectacle placed in front of an eye. The rays 21 emitted from a pixel 22 of an electronic display, in this embodiment a mobile phone 23 placed approximately 35 cm away from the eye, diverge away from the pixel 22. The lens 24 alters the vergence of these diverging rays 21 to substantially parallel rays 26 so that they are converged by lens 25 of the eye onto the retina 29 to produce a sharp image. It will be appreciated that the absence of the lens 24 will lead to the diverging rays arriving at the lens 25 at an angle and thus focus the image behind the retina 29, leading to a blurry image.

The inventors have found that altering the vergence of the rays emitted from a pixel of an electronic display by a predetermined vergence to substantially parallel rays allows the presbyopic eye to produce a sharp image of near objects.

It will be appreciated that the production of parallel rays only corrects vision of emmetropic presbyopic eyes and that the refractive elements may be designed such that the rays emerge with a different vergence for correcting other vision disorders.

Figure 3:
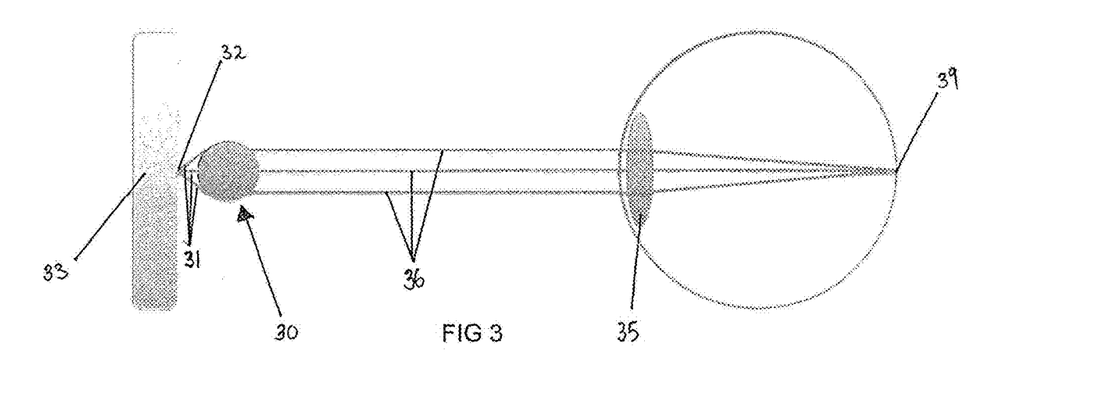
FIG. 3 illustrates an embodiment of the present invention that alters the vergence of light from a pixel of an electronic display.

Turning to FIG. 3, there is illustrated a device 30 for collimating light to improve and/or correct human vision of the electronic display. The device 30 is particularly useful in addressing emmetropic presbyopic eyes. For illustrative purposes, a single device 30 is shown in use with a single pixel 32 of an electronic display 33.

Device 30 utilizes a refractive element located directly adjacent to or on the electronic display at each pixel 32. The refractive element alters the vergence of the rays 31 emitted from the pixel 32 such that they are substantially parallel at positions 36. As such, the rays 31 emitted from the pixel 32 arrive at the lens 35 of the eye in a substantially parallel orientation and thus produces a sharp image on the retina 39.

In some embodiments, the refractive element has a convex structure. The convex structure refracts rays emitted from the associated pixel at a substantially parallel orientation so that a sharp image is formed on the retina of the eye of a user. The refracted rays recreate or mimic the original light emitted from each pixel, but has been adjusted to be substantially parallel rays.

Figure 4:
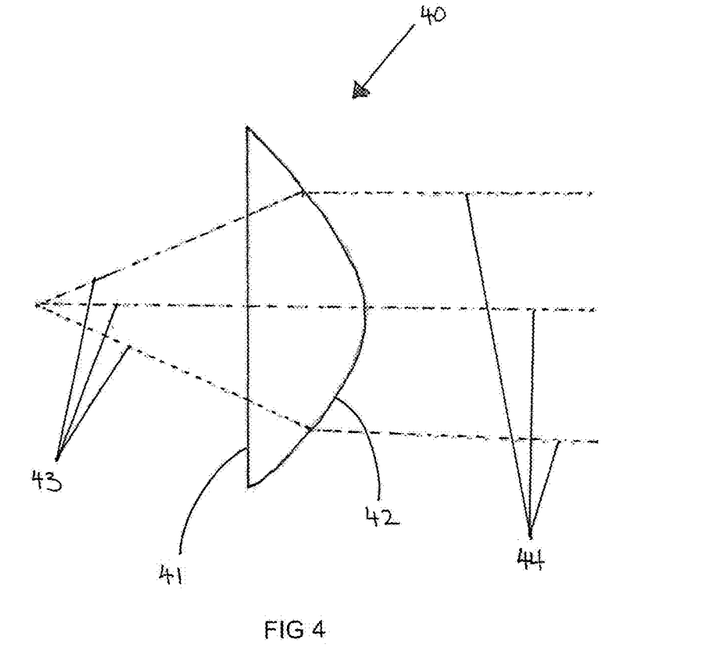
FIG. 4 illustrates an exemplary embodiment of the refractive element.

Shown in FIG. 4 is an exemplary embodiment of a refractive element 40. The refractive element 40 has a plano-convex structure, and represents one illustrative embodiment of the device 30. The plano-convex structure has a surface plane 41 which faces an electronic display, such as the display 33, and an opposite convex structure 42 that faces away from the electronic display. As mentioned above, the convex structure 42 refracts rays 43 emitted from a pixel of an electronic display at a predetermined vergence such that the refracted rays 44 are substantially parallel. In other words, the refractive element 40 collimates the rays 43 emitted from the associated pixel.

The refractive element 40 is formed of a clear polymer that allows for the rays to pass therethrough. Preferably, the refractive element 40 is in the form of a clear polymer with glass-like properties. The clear polymer can be in the form of a UV-cured polymer or a meltable polymer.

It will be appreciated by the person skilled in the art that any clear polymer or material can be utilized. Preferably, the clear polymer or material maintains it shape and refractive index when formed. The clear polymer or material has a refractive index of suitably greater than about 1.2, more suitably between about 1.5 and about 2.5, preferably between about 1.5 and about 2.0, more preferably between about 1.5 and 1.8, and most preferably about 1.555 (589 nm, cured). It is postulated that the design of the refractive element can be modified to allow for the use of materials with lower refractive indices.

The clear polymer or material has a viscosity of suitably between about 0.5 and about 2.5 Pa·s, more suitably between about 1.0 Pa·s and about 2.0 Pa·s, preferably between about 1.2 Pa·s and about 1.8 Pa·s, more preferably between about 1.3 Pa·s and about 1.7 Pa·s, and most preferably about 1.5 Pa·s.

Preferably, the clear polymer is OrmoClear® FX, a product manufactured by Micro Resist Technology GmbH. It will be appreciated by the person skilled in the art that the above list only exemplifies one type of polymer that can be utilized, and that other polymers not expressly listed can also be utilized. It will also be appreciated that the dimensions of the refractive element will vary depending on the properties of the clear polymer. Further, according to some embodiments the clear polymer is in the form of a film having an adhesive layer for bonding the film directly to a display screen of an electronic device.

It will be appreciated that the plano-convex structure has a radius that collimates the rays emitted from the associated pixel of the electronic display. As the size of a pixel is not fixed (i.e., the pixels per device can be fixed but the size of the pixels can vary from one device to another device), it will be appreciated that the dimensions of the plano-convex structure can vary with the dimensions of the associated pixel. As such, the plano-convex structure can vary from device to device.

The plane-convex structure is designed to collimate rays emitted from a pixel to match or emulate the light passing through a spectacle lens.

In one embodiment, the plane-convex structure has a predetermined thickness and a predetermined radius of curvature.

In an exemplary embodiment, the thickness of the plano-convex structure is suitably between about 100 μm and about 250 μm, more suitably between about 150 μm and about 200 μm, preferably between about 170 μm and about 190 μm, more preferably between about 180 μm and about 190 μm, and most preferably about 187 μm.

In one exemplary embodiment, the radius of curvature of the plano-convex structure is suitably between about 50 μm and about 200 μm, more suitably between about 70 μm and about 170 μm, preferably between about 100 μm and about 150 μm, more preferably between about 130 μm and about 140 μm, and most preferably about 137 μm. It will be appreciated that the device 30, and thus refractive elements, may be tailored to the eyes of the user. As such, the refractive elements may be tailored to different prescription levels of the user.

In some embodiments, prism correction can be added to each refractive device to allow a collimated beam to go through an eye pupil and for an image to fall on the proper position on the retina thereby creating the intended image with the intended magnification.

The abovementioned prism correction can be achieved by tilting and/or shifting and/or changing the dimensions of the refractive element. The prism correction is designed to achieve angles of incidence of the rays originating at each pixel onto the pupil and retain similar (but not identical) to those angles achieved using spectacle correction in the spectacle plane. As such, the rays pass through similar points on the pupil plane and thereby achieve a similar image size when projected onto the retina.

As previously mentioned, the refracted rays from the refractive element are substantially parallel to the other rays emitted from the same refractive element. The refracted rays from each of the refractive elements, as a 'bundle', may deviate slightly from parallel when compared to a 'bundle' of rays from another refractive element. This leads to a slight tilt in rays emitted from each refractive element (with respect to other rays emitted from other refractive elements) and results in the rays passing through the pupil in the eye at the desired vergence. It will be appreciated that when applied across the entirety of a display screen of an electronic device, the result is rays that mimic the rays emitted from a device that is positioned a greater distance away from the viewer's eye to thereby allow the presbyopic eye of the user to correctly converge the rays onto the retina to produce a clear image.

In one embodiment, a refractive element such as the refractive element 40 is housed or located in a film, housing or casing. In some embodiments, there is a plurality of refractive elements arranged in a film, housing or casing in an array. In some preferred embodiments, the array is an m by n array, where m is the number of horizontal pixels of an electronic display and n is the number of vertical pixels of the horizontal display. In an embodiment, a plurality or refractive elements housed in the film, housing or casing are applied to the display of an electronic device.

Figure 5:
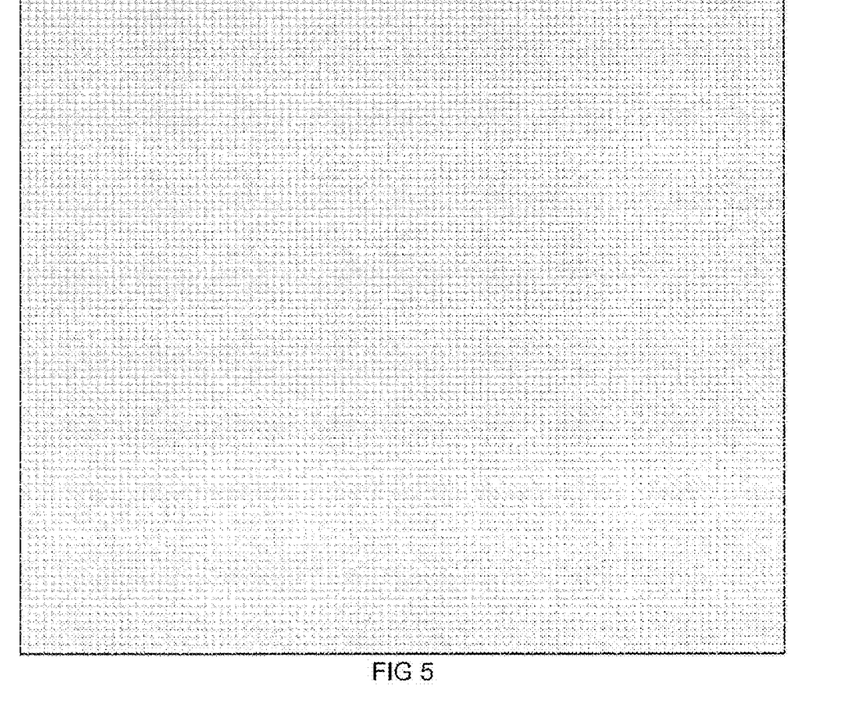
FIG. 5 illustrates a 100×100 array of the refractive element.

Illustrated in FIG. 5 is a 100×100 array of the present invention which can be applied to an electronic display. The array may be in the form of a screen layer or screen protector. In other words, the invention resides in a screen layer or screen protector comprising at least one refractive element described hereinabove. Alternatively, the array may be manufactured into the electronic display. It will be appreciated that the refractive element being located directly adjacent the electronic display means that the refractive element is in direct contact with the electronic display. As such, the refractive element or the abovementioned surface plane is in contact with the electronic display.

In an array, each refractive element, such as the refractive element 40, may be shifted sideways so as to create a prismatic effect so that the collimated light travels at a slight angle. These angles are designed to match the light passing through spectacles for both approach angle and entry angle.

The lateral displacement of each device along the horizontal and vertical meridians can be calculated using the following formulae:

$$\Delta x_i = \frac{X_i}{Z} \; \Delta y_i = \frac{Y_i}{Z}$$

where $X_i$ is the horizontal distance between the centre of the $i^{th}$ pixel and the centre of the screen, $Y_i$ is the vertical distance between the same two points, and Z is the viewing distance between the screen and the front of the eye.

For instance, Z is suitably between about 5 cm and about 100 cm, more suitably between about 10 cm and about 75 cm, preferably between about 20 cm and about 50 cm; more preferably between about 30 cm and about 40 cm; and most preferably about 35 cm.

While the above description describes embodiments of the invention for use with emmetropic eyes afflicted with presbyopia, it, will be appreciated that a simple change of radii of curvature of the refractive element can produce different vergences to achieve a range of prescriptions, such as those afflicted with hyperopia, myopia and astigmatism.

Furthermore, it will be appreciated that the same principles can be applied to plano-concave structures to address hyperopia. Similarly, the dimensions of the refractive element may be altered to address astigmatism. In this regard, addressing astigmatism will require a variation in the refractive element. The refractive elements can have a shape where the horizontal meridian is different to the vertical meridian.

Embodiments of the present invention advantageously provide a solution through the use of a refractive element corresponding to each pixel of an electronic display compared with the prior art. It will be appreciated that each refractive element is preferably formed or arranged such that, primarily, it only refracts the light from a single pixel.

Yet another advantage of embodiments of the present invention is that a user of an electronic device, where the user's eyes suffer presbyopia, does not need to use his or her glasses to see the screen of the device clearly.

Those skilled in the art will appreciate that not all of the above advantages will be obtained by all possible embodiments of the present invention.

Broadly, an electronic display used with the present invention can include handheld electronic devices. Non-limiting examples of the electronic display include mobile phone screens, computer screens, laptop screens and tablet screens.

In another aspect, the invention resides in a method of improving and/or correcting human vision of an electronic display, the method including the steps of:
refracting rays, emitted from a pixel of the electronic display, through a refractive element at a predetermined vergence;
wherein the refractive element is located directly adjacent or on the electronic display,
to improve and/or correct human vision of an electronic display.

The refractive element is as substantially described hereinabove.

As mentioned hereinabove, the refractive element refracts the rays emitted from a pixel of an electronic display at a predetermined vergence. The resulting refracted rays are substantially parallel, to mimic an object being viewed in the distance. This produces a sharp image of near objects on an emmetropic presbyopic eye.

As mentioned previously, the refractive element can have a planar-convex structure, wherein a surface plane faces the electronic display and an opposite convex structure faces away from the electronic display. The rays emitted from a pixel enter the refractive element from the surface plane and leaves the refractive element through the convex structure. The rays entering the surface plane are substantially unaltered, in relation to the angle of incidence, but are altered when leaving the convex structure. The resulting rays leaving the convex structure are substantially parallel. The resulting rays arrive at the eye and produce a sharp image.

In yet another aspect, the invention resides in a method of forming a device for altering vergence of light to improve and/or correct human vision of an electronic display, the method including the steps of:

forming at least one refractive element that refracts rays, emitted from a pixel of an electronic display, at a predetermined vergence, wherein the refractive element is located directly adjacent or on the electronic display.

The refractive element is as substantially described hereinabove.

In one embodiment, the method further includes the step of providing a substrate. Preferably, the substrate is a planar substrate. The planar substrate has a rear surface and a front surface. The rear surface is utilized to face the electronic display.

The refractive element may be formed on the substrate. The refractive elements may be integrally formed, or preformed and attached to, the substrate. The refractive element is formed on the front surface of the substrate so that the convex structure is oriented away from the front surface and the surface plan is in contact with the front surface of the substrate.

The refractive element may be formed by a number of different methods known to the person skilled in the art. For instance, the forming of the refractive element can include the step of printing the refractive element on the front surface. The refractive element may also be formed by removing material from the substrate. For example, the refractive element may be formed by removing material by utilizing laser cutting and the like.

Another method of forming a refractive element on the substrate is to use a mold. The method may further include the step of embossing the structure on the mold. In other words, the step of forming the refractive element includes the step of molding the refractive element. The mold may be formed by high resolution 3D printing, lithography, etching and/or milling. High resolution 3D printing is also known as dual photon lithography. It will be appreciated by the person skilled in the art that a number of different methods can be used to form the mold, and that the above list only exemplifies a few of these methods.

For instance, the refractive element may be extruded from a mold. The refractive element can be embossed from a mold in a reel to reel method followed by a cutting phase. The inventors envisage that laser cutting may be a viable method of forming the mold. Injection molding is another suitable method of forming the refractive element. Preferably, when a mold is used, the refractive element is made of a meltable polymer.

Alternatively, the refractive element can be formed through accurate lithography. In another embodiment, the method of forming the refractive element can include performing accurate lithography on the substrate. The refractive element is then formed through direct casting or embossing.

It will be appreciated that the refractive element and the substrate can be made of the same material or different materials. The substrate is suitably formed of a clear polymer that allows rays to pass therethrough. The substrate is preferably formed of a clear polymer with glass-like properties. Preferably, the clear polymer is OrmoClear® FX.

Embodiments Using Double Mirrors

Alternative embodiments of the invention provide a device and method for altering the vergence of light to improve and correct human vision of electronic displays by employing an arrangement of two mirrors, which reflect and alter the vergence of light emitted from a pixel of an electronic display for receiving at the pupil of a viewer. The altered light effectively recreates the rays emitted by a pixel such that they reach the presbyopic eye as though they were being viewed at a distance (i.e. parallel).

Embodiments of the present invention provide a simpler solution than prior art systems through the use of a binary mirror telescope corresponding to each pixel of an electronic display.

Embodiments of the present invention are also much simple to build, and adds the advantage of zero chromatic aberration (i.e. no dispersion or rainbow effect) compared with some existing lenses.

Figure 6:
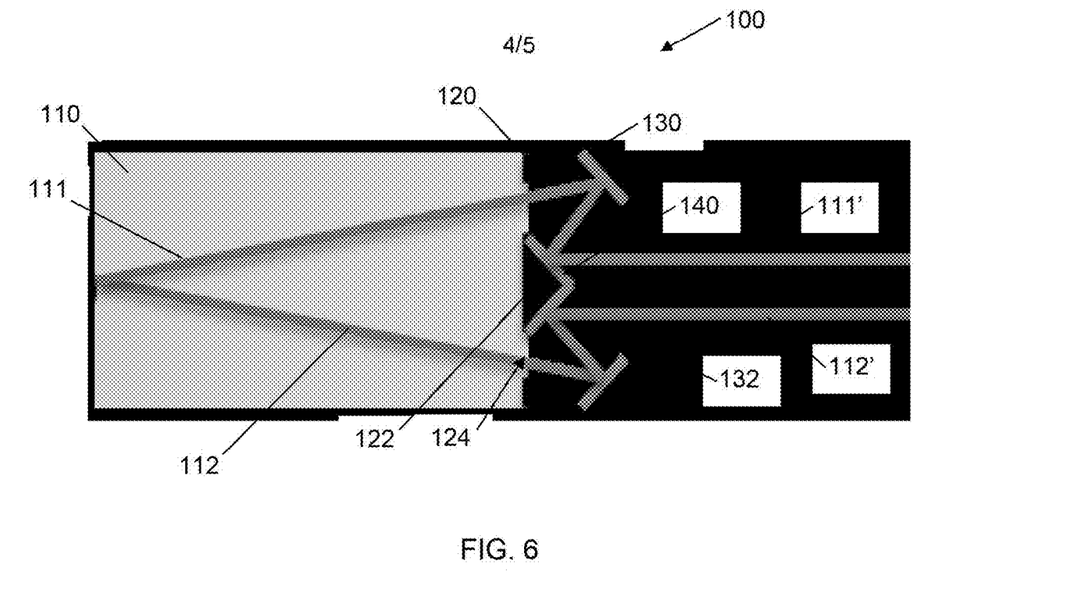
FIG. 6 illustrates a device for altering the vergence of light to improve and correct human vision of electronic displays according to an embodiment of the present invention.

Turning to FIG. 6, there is illustrated a schematic of a device 100 for collimating light to improve and correct human vision of electronic displays, according to a double mirror embodiment of the present invention. For illustrative purposes, a single device 100 is shown in use with a single pixel 110 of an electronic display (not shown).

The device 100 uses an obstruction located on the screen of the device at each pixel to allow a small portion of rays 111,112 of light emitted from the pixel at selected angles and fields to pass through while blocking the remaining rays (not shown). The obstruction is made up of an annulus 120 and a circular obstruction 122 located in the aperture 124 of the annulus 120. As can be seen, the selected rays 111, 112 pass through the aperture 124. It will be appreciated that the obstruction annulus 120 and circular obstruction 122 then block the remaining rays.

The device 100 also includes two mirrors in the form of a primary annular mirror 130 and a secondary mirror 140, which are flat in the illustrated embodiment but can also be curved or spherical depending on the application.

According to some embodiments, the primary annular mirror 130 can be a hollow, substantially frustoconical shape having openings at the diametrically opposing faces of the shape for receiving and communicating light.

The secondary mirror 140 has a substantially conical shape.

In the present embodiment, the primary annular mirror 130 and the secondary mirror 140 are positioned at precalculated angles to reflect the rays 111, 112 and produce parallel rays from each pixel 110. However, it will be appreciated that the production of parallel rays only corrects vision of emmetropic eyes and that the rays can be calculated to emerge with a different vergence for correcting vision of myopic or hyperopic eyes, for example.

In operation, the rays 111, 112 pass through aperture 124 while the remaining rays are obstructed and not able to project further than the screen of the device.

Rays 111, 112 passing through aperture 124 are reflected by the primary annular mirror 130 onto the secondary mirror 140. The rays 111, 112 are then reflected off the secondary mirror 140 resulting in the collimated rays 111', 112' which are directed towards a viewer's eye (not shown) through the aperture 132 of the primary annular mirror 130.

The collimated rays 111', 112' recreate or mimic the original light emitted from each pixel 110, but have been adjusted to remove the diverging rays that cannot be properly converged by an emmetropic presbyopic eye.

When applied across the entirety of a display of an electronic device, such as a phone or computer screen, for example, the result is parallel rays emitted from every pixel of the electronic device. Such parallel rays mimic the parallel rays that are created when the device is positioned a greater distance away from the viewer's eye thereby allowing the emmetropic presbyopic eye of the user to see the image on the display clearly.

One particular advantage of using a mirror rather than a lens is that all colours are reflected along the same path by a mirror rather than being refracted through different paths as in a lens. Therefore, embodiments of the present invention can be applied to both colour screens and monochromatic screens.

Figure 7:
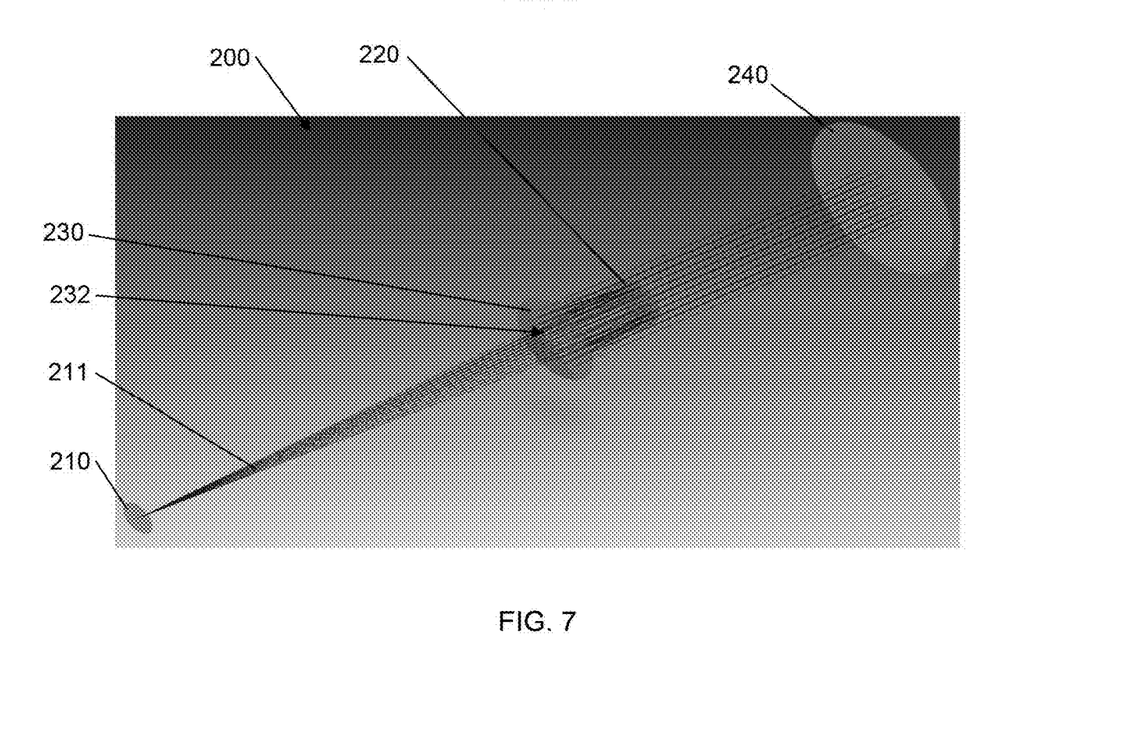
FIG. 7 illustrates a device for altering the vergence of light to improve and correct human vision of electronic displays according to another embodiment of the present invention.

FIG. 7 illustrates a schematic of a device 200 used with a pixel 210 of an electronic display screen, according to an alternative embodiment of the present invention. The device 200 uses spherical mirrors in the form of a primary mirror 220 and a secondary annular mirror 230 to block some rays, and then reflect and collimate other rays 211 emitted from the pixel 210. The primary mirror 220 is a convex mirror while the secondary annular mirror 230 is a concave mirror.

In the illustrated embodiment, light 211 emitted from a pixel 210 is shone through an aperture 232 at the centre of the secondary annular mirror 230, whose imaginary vertex is touching the screen 240, onto the primary mirror 220.

The diameter of the aperture 232 in the secondary annular mirror 230 approximately matches the diameter of the primary mirror 220. In particular, because of how aluminium will be precipitated to form the mirrors 220, 230. Further, the approximately similar diameters of the aperture 232 and the primary mirror 220 facilitates the effect of the collimated light reflecting from the secondary annular mirror 230 and around the primary 220. If the diameter of the primary mirror 220 was significantly larger or the diameter of the aperture 232 significantly smaller, the collimated light would not be able to pass by the primary mirror 220.

The convex primary mirror 220 reflects and expands the light 211 onto the concave secondary annular concave mirror 230, which then collimates the light 211 around the primary mirror 220 and towards the screen 240 or viewer's eye. Rays of light pointing directly at an eye of a human observer of the pixel 210 are reflected directly backwards by the primary convex mirror 220 and are thereby blocked from reaching the user's eye.

Similar to device 100, the collimated rays reflected by secondary annular concave mirror 230 recreate or mimic the original light emitted from each pixel 210 but have been adjusted to remove diverging rays that cannot be properly converged by a presbyopic eye.

In some embodiments, a different prism correction can be added to each device 100, 200 to allow a collimated beam to go through an eye pupil and for an image to fall on the proper position on the retina thereby creating the intended image with the intended magnification.

The abovementioned prism correction can be achieved by tilting and/or shifting one or both of the telescopic mirrors 130, 140, 220, 230. The prism correction is designed to achieve angles of incidence of the rays originating at each pixel onto the pupil and retina similar (but not identical) to those angles achieved using spectacle correction in the spectacle plane. Thus, the rays pass through similar points in the pupil plane and thereby achieve a similar image size when projected onto the retina.

As described above, when applied across the entirety of a display screen of an electronic device, such as a phone or computer screen, for example, the result is parallel rays emitted from every pixel of the electronic device which mimic parallel rays that are created when the device is positioned a greater distance away from the viewer's eye to thereby allow the presbyopic eye of the user to correctly converge the rays onto the retina to produce a clear image.

The device 200 has been modified from the device 100 described above to improve efficiency and use much more of the light emitted from each pixel. The device 200 uses most of the centrally emitted rays from the pixel rather than some edge rays, as in the device 100, and uses spherical mirrors for the telescope rather than the planar mirrors used in device 100. The device 200 is also more compact than device 100.

Figure 8A:
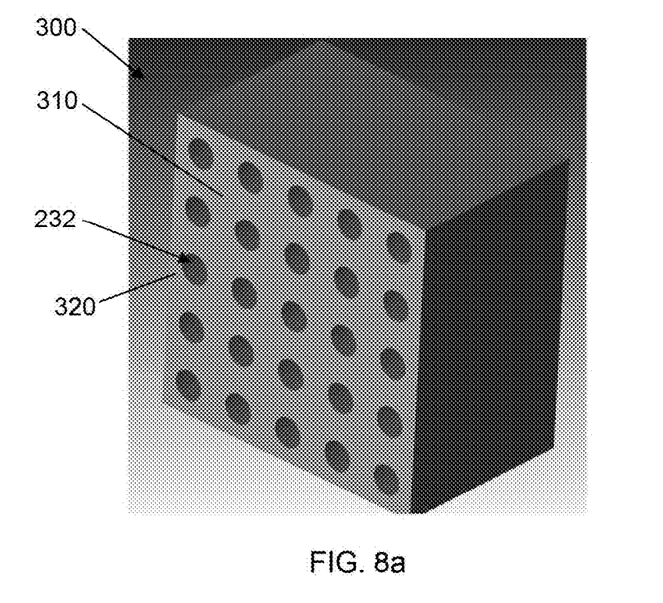
FIGS. 8a and 8b illustrate perspective views of a casing housing the device of FIG. 7 according to an embodiment of the present invention.
Figure 8B:
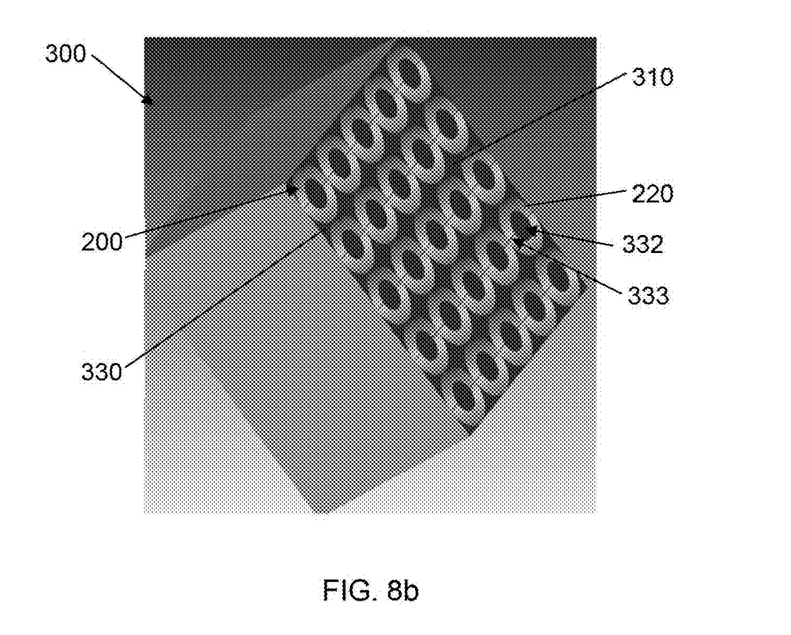

Since the devices 100, 200 described above operate on a per pixel basis, the devices 100, 200 need a rigid casing to keep all mirrors 130, 140, 220, 230 in place and appropriately aligned with a corresponding pixel. A plurality of devices 200 housed in a casing 300 is shown in FIGS. 3a and 3b.

The illustrated embodiment shows a casing 300 housing a 5×5 array arrangement of the devices 200. However, it will be appreciated that the casing 300 and array can be scaled up or down to suit a particular screen or need. In use, the casing 300 is placed adjacent a display screen having a 5×5 array of corresponding pixels, where each device 200 is aligned with a single pixel.

The casing 300 can have up to 10 μm on either side of a device, such as device 100, 200 described above, for example, to create rigid walls 310 between each device 200. Advantageously, this minimises the effect on light efficiency.

With reference to FIG. 8a, there is shown a back face 320 of the casing 300, which back face 320 is to be located adjacent the screen of the electronic device (not shown). From this view, an array of apertures 232 can be seen, which allows the light emitted from an adjacent pixel to be received into the casing 300. As described above with reference to device 200, once the light passes through an aperture 232, it is reflected by the primary mirror 220 onto the secondary annular mirror 230, which then collimates the light around the primary mirror 220.

Referring now to FIG. 8b, a front face 330, directly opposing the back face 320, has an array of apertures 332 corresponding to each device 200 which allows the collimated light reflected off each secondary annular mirror 230 and around each internal primary mirror 220 to exit the casing 300 and be directed to a viewer's eye.

A strut 333 is used to hold the primary mirror 220 in place. The strut 333 will cast a shadow for a short distance, but light will be recovered before the viewer's eye such that there is no discernable difference to the image.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A device for altering vergence of light to improve and/or correct human vision of an electronic display, the device comprising:

a refractive element comprising at least one convex or plano-convex structure that refracts rays, emitted from a pixel of an electronic display, at a predetermined vergence, wherein the refractive element is located directly adjacent or on the electronic display; and wherein the at least one convex or plano-convex structure substantially overlaps the pixel of the electronic display; and wherein the device is housed or located in a film or casing; and wherein the device produces a sharp image projected onto a retina.

2. The device of claim 1, wherein the convex or the plano-convex structure has a radius that collimates the rays emitted from the pixel.

3. The device of claim 1, wherein a thickness of the convex or the plano-convex structure is between about 100 µm and about 250 µm.

4. The device of claim 3, wherein the thickness of the convex or the plano-convex structure is between about 180 µm and about 190 µm.

5. The device of claim 1, wherein a radius of curvature of the convex or the plano-convex structure is between about 50 µm and about 200 µm.

6. The device of claim 5, wherein the radius of curvature of the convex or the plano-convex structure is between about 130 µm and about 140 µm.

7. The device of claim 1 wherein the refractive element collimates rays emitted from the pixel at a predetermined angle.

8. The device of claim 1, wherein refracted rays are substantially parallel.

9. The device of claim 1, wherein the refractive element is formed of a clear polymer.

10. The device of claim 9, wherein the clear polymer has a refractive index of between about 1.5 and about 1.8.

11. A method of improving and/or correcting human vision of an electronic display, the method including the steps of:

refracting rays, emitted from a pixel of the electronic display, through a refractive element of a device at a predetermined vergence;

wherein the refractive element comprises at least one convex or plano-convex structure; and wherein the at least one convex or plano-convex structure substantially overlaps the pixel of the electronic display; and wherein the refractive element is located directly adjacent or on the electronic display, to improve and/or correct human vision of an electronic display; and wherein the device is housed or located in a film or casing; and wherein the method produces a sharp image projected onto a retina.

12. A method of forming a device for altering vergence of light to improve and/or correct human vision of an electronic display, the method including the steps of:

forming in a device at least one refractive element comprising at least one convex or plano-convex structure that refracts rays, emitted from a pixel of an electronic display, at a predetermined vergence, wherein the refractive element is located directly adjacent or on the electronic display, and wherein the at least one convex or plano-convex structure substantially overlaps the pixel of the electronic display; and wherein the device is housed or located in a film or casing.

13. The device of claim 1, wherein the at least one convex or plano-convex structure is tilted and/or shifted from the pixel of the electronic display thereby resulting in a prism correction.

14. The device of claim 1, wherein the refractive element comprises two or more convex or plano-convex structures positioned in front of two or more pixels of the electronic display; and wherein the two or more convex or plano-convex structures have different dimensions thereby resulting in a prism correction.

15. The method of claim 11, wherein the at least one convex or plano-convex structure is tilted and/or shifted from the pixel of the electronic display thereby resulting in a prism correction.

16. The method of claim 11, wherein the refractive element comprises two or more convex or plano-convex structures positioned in front of two or more pixels of the electronic display and wherein the two or more convex or plano-convex structures have different dimensions thereby resulting in a prism correction.

17. The method of claim 12, wherein the at least one convex or plano-convex structure is tilted and/or shifted from the pixel of the electronic display thereby resulting in a prism correction.

18. The method of claim 12, wherein the refractive element comprises two or more convex or plano-convex structures positioned in front of two or more pixels of the electronic display and wherein the two or more convex or plano-convex structures have different dimensions thereby resulting in a prism correction.

* * * * *